Jan. 12, 1965   P. E. TAYLOR   3,165,742
ANTENNA RANGE SIMULATOR
Filed Sept. 19, 1961   3 Sheets-Sheet 1

INVENTOR.
PAUL E. TAYLOR
BY Hurwitz and Rose
ATTORNEYS

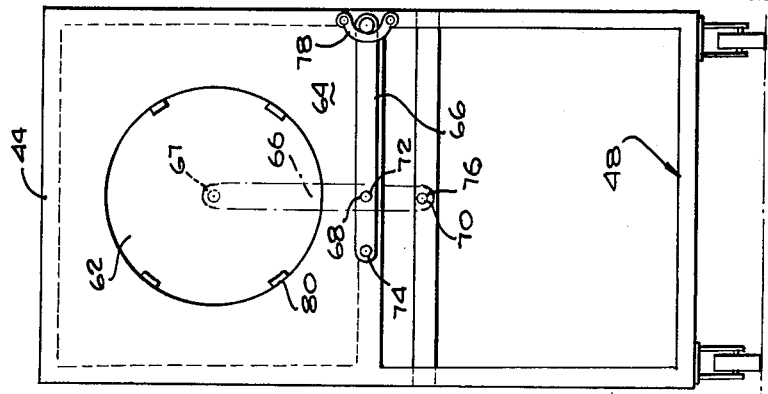
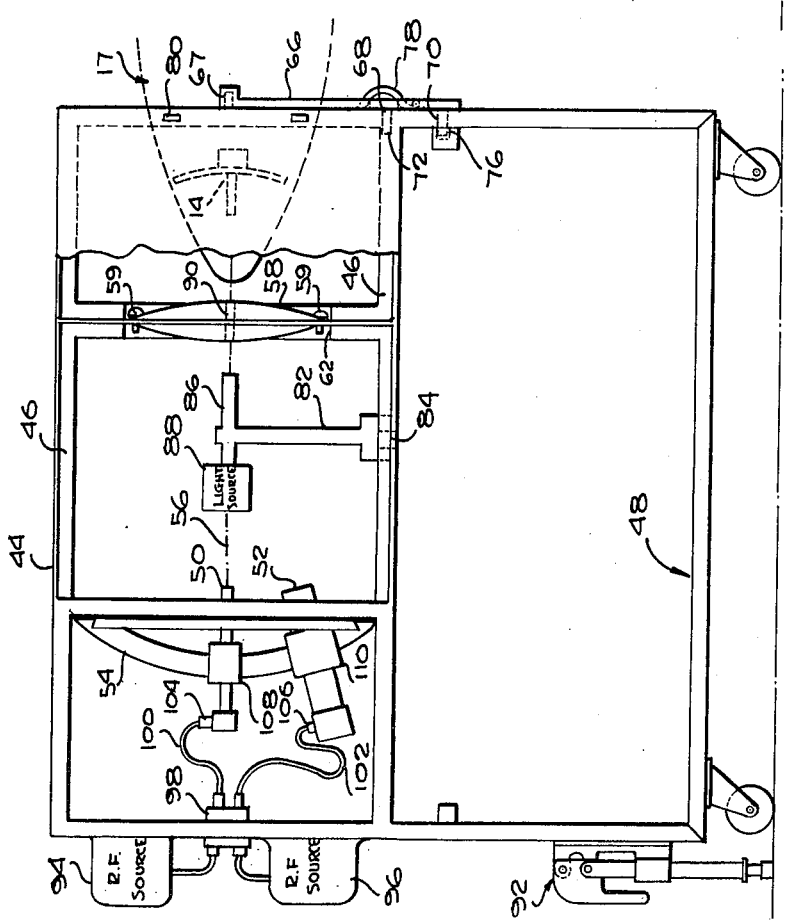

Jan. 12, 1965 P. E. TAYLOR 3,165,742
ANTENNA RANGE SIMULATOR
Filed Sept. 19, 1961 3 Sheets-Sheet 3

INVENTOR.
PAUL E. TAYLOR
BY Hurvitz and Rose
ATTORNEYS 3,165,742
ANTENNA RANGE SIMULATOR
Paul E. Taylor, Springfield, Va., assignor to Melpar, Inc., Falls Church, Va., a corporation of Delaware
Filed Sept. 19, 1961, Ser. No. 139,164
8 Claims. (Cl. 343—17.7)

This invention relates to a portable antenna range simulator unit for testing radar and guidance antennas and systems, and more particularly to a portable antenna range simulator unit for use in close proximity to an antenna to simulate distant targets for testing various performance characteristics of the radar or guidance systems associated with antenna, or of the antenna itself.

The usual method of testing guidance systems, according to the prior art, involved utilization of a free space antenna pattern range equipped with various alignment devices to determine boresight and tracking accuracy of the system. Large space requirements exist in the practice of this method, and the space must be free of electromagnetic environment which may provide interference. Similar methods and considerations apply to antenna range simulator tests of radar systems, and to the testing of antenna patterns generally.

In accordance with the present invention, antenna and system tests, in respect to boresight alignment of guidance system, are carried out by means of a small, compact, mobile, interference free device. A modification of the system, based on identical principles, may be employed to measure power output of a radar transmitter, receiver sensitivity of a radar receiver, accuracy of range indication and/or directivity of a radar system. The advantages which the present system possesses over the prior art method above described relate to savings of space, capability of operation in a complex electromagnetic environment, portability of the test equipment so that tests can be conducted without moving the equipment being tested, and simplicity of operation.

It is a primary object of the present invention to provide a novel test equipment for equipments employing directional antennas.

It is another object of the invention to provide a system for testing boresight alignment of guidance systems.

It is a further object of the invention to provide a compact, mobile, self-contained test unit for testing antennas, radar systems and guidance systems, and which is shielded for operation in a complex electromagnetic environment.

A further object of the invention is to provide a novel antenna range simulator.

Still a further object of the invention is to provide a self-contained system for the accurate measurement in a radar system receiver sensitivity, and accuracy of target information presentation.

According to the present invention and in accomplishing the above objects, there is provided at least one movable test probe for propagating radio frequency energy in spherical wavefronts located in a small, portable anechoic housing, placed in close proximity to the radar or guidance antenna being tested. A radio frequency responsive lens in the chamber converts the spherical wavefronts of the test probe into substantially plane wave fronts to simulate distant echoes of radar system being tested. The accuracy of the radar or guidance system is checked by moving the test probe feed horn to various known positions to provide plane wave fronts from various directions simulating distant target echoes and by comparing the known positions against those of the display or other presentation of the guidance or radar system under test.

In one embodiment of the invention the portable radio frequency insertion unit has a mobile housing of conductive material completely lined with lossy dielectric material thereby forming a substantially anechoic chamber. At one end of the chamber are two radio frequency propagating test probes movably mounted and positionable by motion generating means. A dielectric lens located in the housing in the propagation path between the test probes and the antenna under test serves to convert spherical wave fronts from the probes to plane wave fronts at the antenna to simulate distant targets.

These and other objects and features will be better understood by referring to the accompanying drawings in which like numerals will be used to designate like parts throughout the same, and in which:

FIGURE 3 is a modified cutaway view of an antenna range simulator embodying the invention;

FIGURE 4 is a front view of the antenna range simulator showing the optical alignment apparatus;

Figure 1:
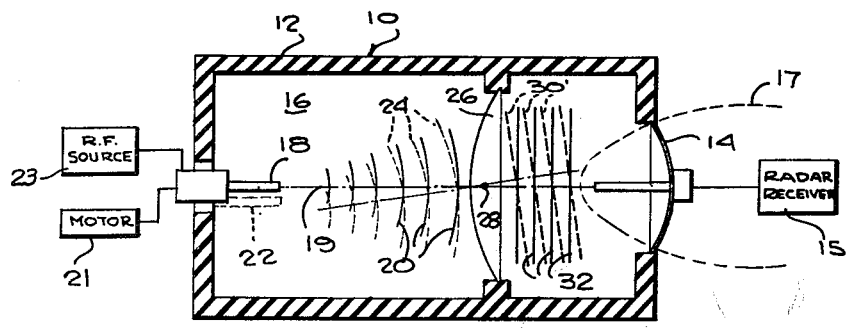
FIGURE 1 is a diagrammatical illustration of an embodiment of a radio frequency insertion unit according to the invention.

Referring to FIGURE 1, the antenna range simulator unit of the invention is shown generally at 10 having a housing 12 of lossy dielectric material highly absorbent of radio frequencies (hereinafter abbreviated as R-F), particularly in the frequency bands including the test frequencies. The lossy material prevents the excessive interference of external R-F energy with that generated in the unit 10, and also prevents internal reflections of R-F energy. An antenna 14 of a radar or guidance system receiver 15 to be tested is shown inserted at the open end of the substantially anechoic chamber 16 formed by housing 12. The antenna 14 is shown housed in a radome indicated by dotted lines 17. A test probe 18 located on the center axis 19 of the unit 10 is movably mounted to nutate in the housing at the other end of chamber 16 by a motor 21 and propagates R-F energy having spherical wavefronts indicated by the lines 20. Test probe 18 may be in the form of a pyramidal or conical horn excited by a waveguide, or preferably in the form of a waveguide stub. A suitable source of R-F energy is indicated at 23.

As indicated by the dotted lines 22, the test probe may be nutated in an off-axis position to rotate about axis 19. The spherical wavefronts emanating therefrom are indicated by dotted lines 24.

An R-F lens 26 is located in the chamber 16 so that its axis coincides with axis 19. The R-F optical center of lens 26 is indicated at 28.

Lens 26 may be of dielectric material such as Plexiglas and converts spherical R-F wavefronts from probe 18 to plane wavefronts indicated by lines 30. Lens 24 may be plano-convex or double-convex. When test probe 18 is moved to an off axis position for nutation about axis 19, lens 26 converts the spherical wavefronts indicated by dotted lines 24 to plane wavefronts having an orientation indicated by the dotted lines 32. To the antenna 14 undergoing test, the plane wavefronts 30 and 32 appear to be target echoes emitted from a distant point of varying directions.

Figure 2:
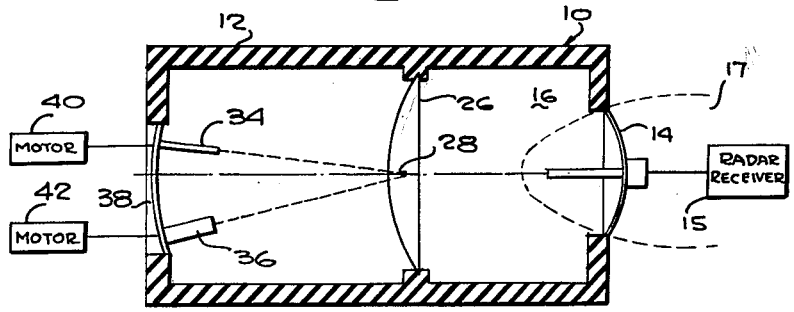
FIGURE 2 is an illustrative diagram of another embodiment according to the invention.

In the embodiment of FIGURE 2, two test probes 34 and 36 are movably mounted on a support 38 which is curved so that each of the probes always transmit R-F energy in the direction of point 28 in the optical plane of the lens 26. By transmitting through point 28, any aberrations in lens 26 are reduced to a minimum, thus insuring the efficient conversion of spherical wavefronts from the probes to plane wavefronts at antenna 14.

Probes 34 and 36 are each mounted to be movable up and down on support 38 and may be driven by suitable motors indicated in blocks 40 and 42. The installation of two test probes instead of one has the advantage that each probe may be selectively energized to transmit in a different frequency band, thereby permitting one portable simulator unit to be used in testing a larger number of different equipments. By moving one of the probes 34, 36 to certain accurately predetermined positions on curved support 38, the accuracy of the radar or guidance system 17 may be checked by noting any disparity between the known positions of a test probe and the observed position of a target simulated by the test probe on a target display or presentation of the radar system being tested.

Referring to FIGURES 3 and 4, the portable antenna range simulator of the invention is shown in a housing 44 having walls 46 of lossy dielectric material. Housing 44 is mounted on a carriage 48. In a well known manner, the walls and top of the front section of housing 44 may be removed.

Test probes 50 and 52 are shown mounted on a curved support 54. Support 54 is mounted in the rear portion of housing 44. The mounting of the probes and support will be discussed in further detail in conjunction with FIGURES 5 and 6. The axis of the unit is indicated at 56. A dielectric lens 58 according to the invention is suitably mounted as by bolts 59 on a transverse housing member 60 which is also lined with a lossy dielectric material. An opening at the front of the housing 44 is indicated at 62.

At the front end of the housing 44 is an optical alignment assembly 64 which is used to accurately align either of the test probes 50 and 52 on unit axis 56 so that a test probe after alignment may be used to test the boresight alignment of an antenna 14 to be tested. As best seen in FIGURE 4, optical assembly 64 includes an optical reference member 66 having optical crosshair elements 67 in one end thereof and which are arranged to coincide when viewed exactly along axis 56. Optical reference member has at its other end accurately machined pins 68 and 70 longitudinally displaced therein. Holes complementary in shape to pins 68 and 70 are drilled through the housing 44 into frame members thereof at 72, 74 and 76.

When pins 68 and 70 on member 66 are fitted into holes 72 and 76 optical elements 67 will be located to define optical axis 56 of the unit. When not in use, optical reference member 66 may be stored with pin 68 in hole 72, and the other end secured by a snap fastener 78 mounted on the front of housing 44.

Opening 62 in housing 10 is of suitable size to receive the nose section of a missile or a radome 17. If the orientation of the antenna 14 is already accurately known to be centered on the longitudinal axis of the nose section or on a known axis of a radome, alignment tabs 80 mounted at spaced locations on the periphery of the housing opening 62 may be used to align the antenna 14 to be coaxial with axis 19 of the unit. Tabs 80 may be preset to positions for a given antenna housing 17, or alternatively tabs 80 may be adjustable as by screws or other suitable well known means to positions determined by actual measurement of the position of an antenna 14 in its particular housing.

In cases where actual measurement is necessary to determine the location of an antenna in an antenna housing 17, optical means are provided in unit 10 for aligning said antenna in the following manner.

The top and walls of the front section of housing 44 are removed, and a portable pedestal 82 is mounted in a recess 84 in the floor of housing 44. Mounted at the top of pedestal 82 along axis 56 is an optical lens element 86 of well known design and fed by a light source 88 mounted therewith. Pedestal 82 is dimensioned so that optical lens element 86 focuses light from source 88 into a narrow, thin pencil beam along axis 56. A small hole 90 may be drilled through lens 58 along axis 56 without any deleterious effect on the performance of the lens, or if desired, the lens may be removed. Light from source 88 will then pass through opening 62 on axis 56.

In order to align antenna 14 whose location in a housing 17 is unknown, the housing 17 may be removed, and the simulator unit moved on carriage 48 into position adjacent thereto until the thin beam of light along axis 56 is exactly center along the central axis of the antenna 14. If necessary, further optical alignment elements may be attached to antenna 14 for alignment purposes. This may be done while housing 17 is located outside of unit housing 44. If desired, after alignment by the foregoing optical means, housing 17 may be replaced and marked at the location of beam impingement. A jack 92 of conventional design mounted on the carriage 48 may be used to adjust the pitch angle of the unit when aligning the unit with antenna 14.

The R-F feed connections for the probes are also shown in FIGURE 3. Suitable R-F sources indicated at 94 and 96 respectively and are shown removably mounted on the rear wall of housing 44. A coaxial terminal connector 98 is mounted on the rear wall of housing 44 to receive inputs from sources 94 and 96 over coaxial leads therefrom. Coaxial leads 100 and 102 connected at terminal connector 98 supply R-F to the probes 50 and 52 at connectors 104 and 106.

Probes 50 and 52 are waveguide stubs preferably rectangular in cross section and of dimensions appropriate to the frequency band transmitted therethrough according to well known principles. For example, probe 50 may conveniently transmit in the X band while 52 transmits in the C band. Both of said waveguide stubs are excited by conventional screw probes in the connections 104 and 106 and located near the closed end of each waveguide stub. If desired, each of the waveguide stubs 50 and 52 may be ridge loaded for transmission therefrom over a frequency band larger in width.

Figure 5:
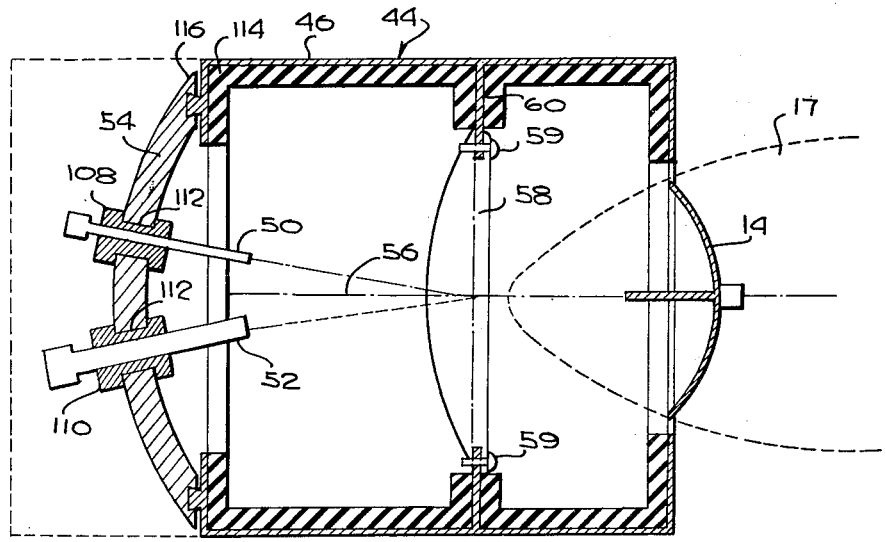
FIGURE 5 is a longitudinal sectional view of an embodiment of the invention.
Figure 6:
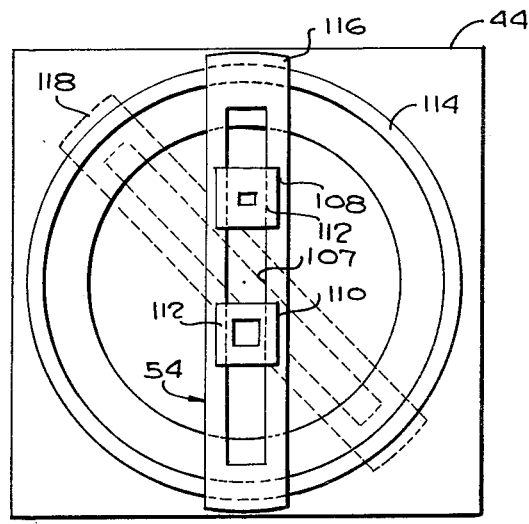
FIGURE 6 is a rear view of the embodiment of FIGURE 5.

The mountings of the probes and support in housing 44 are shown in greater detail in FIGURES 5 and 6, to which reference is now made.

For the sake of simplicity, the optical alignment apparatus, the coaxial connectors and leads shown in FIGURE 3 have been omitted. Each of the probes 50 and 52 is shown slidably mounted on curved support 54 for manual movement thereon. Support 54 has a longitudinal slot 107 therein of suitable size to permit the placing of the probe waveguide stubs therethrough.

To move the probes along support 54, there are provided collars 108 and 110 rigidly secured to probes 50 and 52, respectively. Grooves 112 in the sides of collars 108 and 110 and complementary in shape to the inside portion of slot 107 provide surfaces for sliding frictional engagement with support 54. The support 54 may also be provided with calibration marks etched thereon to facilitate accurate positioning of the probes thereon.

Support 54 is mounted on the rear of housing 44 for rotation thereon so that probes 50 and 52 may be positioned anywhere in the rear area of the simulator unit 10. To carry this out, circular track 144 in the form of a flange is mounted on the rear of housing 44. A curved groove 116 complementary in shape to the circular track 114 is cut in the underside of each end of support 54 so that support 54 may be rotated on track 114 in sliding engagement therewith about axis 56. Dotted lines 118 in FIGURE 6 indicate another exemplary position to which support 54 has been rotated. This arrangement permits the probes 50 and 52 to always be pointed toward center region of lens 58 in all rotational positions of support 54 and in all positions of the probes 50 and 52 on support 54. In that the probes are always pointed toward center region of lens 58, phase distortion is held to a minimum in the plane wavefronts reaching antenna 14 from probes 50 and 52.

Figure 7:
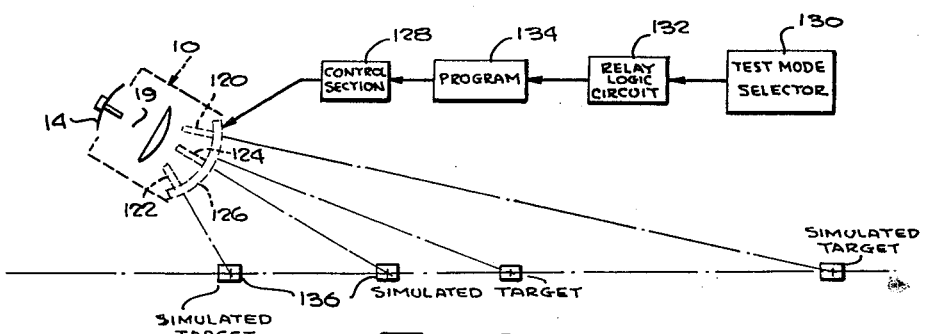
FIGURE 7 is an illustrative diagram showing the operation of the invention.

FIGURE 7 shows diagrammatically the invention in use with means which could be provided for the automatic selection and control of the energization and movements of the components thereof. Test probes according to the invention are shown at 120 and 122. 124 indicates the axial position of one of the probes. 126 is a rotatable support for the probes 120 and 122. As indicated in block 128, a control section may be provided to energize and drive the various components of the unit 10.

A test mode selector indicated at 130 may provide a selection of the characteristics or sequence thereof of antenna 14 which are to be tested. A relay logic circuit at 132 responsive to the test mode selected may provide a control to select appropriate program schedules at a programmer 134. Programmer 134 would provide inputs for control section 128 to energize and drive one of the probes selected for testing to predetermined positions for simulating targets indicated 136.

In operation, after optical alignment of the antenna range simulator unit as previously described has been accomplished an appropriate one of the probes, say probe 50, is energized according to the operational frequency band of antenna 14. Probe 50 is located on axis 56 on which has been optically aligned. Spherical wavefronts from probe 50 are converted to plane wavefronts by lens 58. A display or data presentation in radar receiver 15 associated with antenna 14 is observed or measured, and if the display or presentation apparatus is not in correct adjustment (for example, sweep center bias control) a target pip would be indicated in an off-center position.

Probe 50 and support 54 may then be moved so as to place probe 50 in as many off-axis positions as desired in order to determine the accuracy of the radar receiver in all compass directions. For example, as shown in FIGURE 7, simulated targets 136 would appear to be echoes from far afield on different compass bearings.

The bearing accuracy of radar receiver 15 may be checked by either direct measurement of the angle of test probe 50 to axis 19 or by using the suitably calibrated marks located on support 54.

In order to test the range sensitivity of antenna 14, the power of the R-F source may be varied to produce simulated target echoes of varying strength. By comparing the signal strength of target echoes with that of known target echoes representing range and/or size, the radar receiver 15 and antenna 14 may be calibrated for range sensitivity in the same manner as carried out in well known techniques using actual targets.

In summary, it will be appreciated that the present invention possesses many advantages which greatly facilitate the testing of radio frequency antennas such as, for example, those in guided missile systems particularly. Since the portable radio frequency insertion unit of the invention may be moved about easily, the testing of the guidance systems of missiles stored at missile launching sites, operational launching areas, aboard ships, and at factory check-out may be speedily accomplished. Aircraft radar systems may be tested at airport locations. Operational units may be provided with the portable radio frequency insertion units to implement testing in the field on a scheduled basis. In this manner, an up-to-date inventory indicating the status of radar and guidance systems on hand may be kept.

It is understood that the above description of the invention includes embodiments thereof which are only illustrative, it being understood that other embodiments and modifications of the invention within the spirit thereof will occur to those skilled in the art, the scope of the invention being limited only by the following appended claims.

What is claimed is:

1. A radar test equipment, said radar including a directive receiving antenna, including a tubular housing having an axis, said housing having an internal lining substantially completely absorptive of radio waves, a directive transmitting antenna located adjacent one end of said housing, a lens located at an intermediate point of said housing, the remaining end of said housing including an opening receptive of said directive receiving antenna to be tested, said lens having the property of converting non-planar waves transmitted by said transmitting antenna to planar waves at said opening, the direction of energy fronts of said planar waves being a function of the directivity of said transmitting antenna with respect to the axis of said housing and means for varying the directivity of said transmitting antenna to simulate arrival of radio waves at said directive receiving antenna from a plurality of different directions.

2. The combination according to claim 1 wherein said transmitting antenna is a probe.

3. The combination according to claim 2 wherein said probe is a stub extending generally parallel to said axis.

4. The combination according to claim 1 wherein said last means includes means for at will moving said transmitting antenna transversely of said tubular housing.

5. The combination according to claim 1 wherein said last means includes first means for moving said transmitting antenna linearly transversely of said tubular housing and second means for moving said transmitting antenna circularly transversely of said tubular housing.

6. The combination according to claim 2 wherein said transmitting antenna is a stub extending generally parallel to said axis, and wherein said last means includes means for moving said stub transversely of said tubular housing both linearly and circularly.

7. The combination according to claim 6 wherein is further provided optical means for aligning said directive receiving antenna with said axis.

8. The combination according to claim 2 wherein is further provided optical means for aligning said directive receiving antenna with said axis.

References Cited by the Examiner

UNITED STATES PATENTS

| | | | |
|---|---|---|---|
| 2,547,416 | 4/51 | Skellett | 343—911 |
| 2,659,818 | 11/53 | Torrey | 343—754 |
| 2,934,759 | 4/60 | Uphoff | 343—17.7 |
| 2,942,257 | 6/60 | Huntington | 343—17.7 |
| 2,975,419 | 3/61 | Brown | 343—754 |
| 2,988,740 | 6/61 | Albanese | 343—703 |
| 3,114,910 | 12/63 | Rymes | 343—17.7 |
| 3,120,641 | 2/64 | Buckley | 343—18 |

CHESTER L. JUSTUS, *Primary Examiner.*